United States Patent [19]

Hepner

[11] 4,434,780

[45] Mar. 6, 1984

[54] EXTENDIBLE GRILL

[76] Inventor: Glen L. Hepner, P.O. Box 120, Trenton, Utah 84338

[21] Appl. No.: 462,709

[22] Filed: Jan. 31, 1983

[51] Int. Cl.³ .............................. F24C 1/16; F24B 3/00
[52] U.S. Cl. ................................. 126/9 B; 126/25 R; 126/29; 126/339; 99/449
[58] Field of Search ................. 126/29, 25 R, 30, 9 B, 126/339, 332, 337 A, 337 R, 333; 211/201, 181; 220/4 A, 8, 96, 94 R; 99/449, 393; 248/424, 163 A, 175; 312/321, 330 R, 335

[56] References Cited

U.S. PATENT DOCUMENTS

| | | | |
|---|---|---|---|
| 1,484,476 | 2/1924 | Currie | 126/9 B |
| 1,973,416 | 9/1934 | Otte | 126/339 X |
| 2,040,996 | 5/1936 | Hungerford | 126/339 X |
| 4,178,844 | 12/1979 | Ward et al. | 99/449 |

FOREIGN PATENT DOCUMENTS 1191799  5/1970  United Kingdom ................ 126/339

*Primary Examiner*—Samuel Scott
*Assistant Examiner*—Randall L. Green
*Attorney, Agent, or Firm*—Edward E. McCullough

[57] ABSTRACT

A portable cooking grill has an annular frame with parallel bars spanning it. Each of the bars is attached at each end to opposite sides of the frame. Two U-shaped extension members are attached to selected parallel bars, for sliding motion thereon, and can be moved outwardly from beneath the frame to provide adjustable supports for the grill. These extension members may be supported on indigenous structures, such as stones. The extension members may also be spring biased toward the parallel bars to promote a compact stowage mode that does not require further packaging.

11 Claims, 7 Drawing Figures

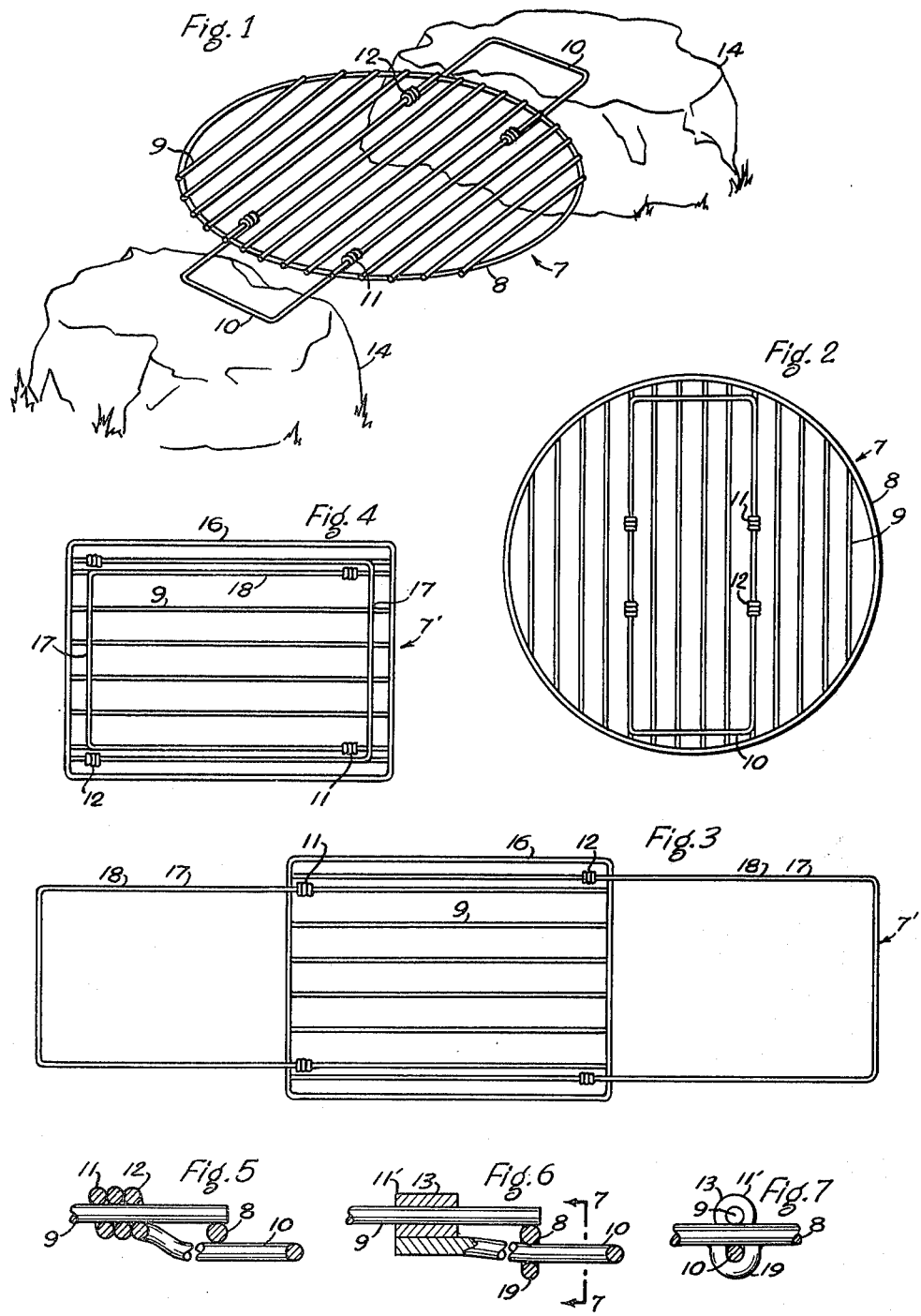

EXTENDIBLE GRILL

BACKGROUND OF THE INVENTION

A. Field of the Invention

This invention relates broadly to outdoor cooking equipment. More specifically, it relates portable grills for use with indigenous supports; so that it is especially useful in backpacking and camping.

B. Description of the Prior Art

Portable grills for cooking food over an open fire are known in the art. For example, U.S. Pat. No. 1,569,401 to Sims shows a grill having a rectangular frame with parallel bars attached to the frame. The frame can be folded in the middle, parallel to the bars. When used, it is supported on three side walls that are hinged to the frame and can be locked in place. U.S. Pat. No. 3,905,286 to Le Grady is similar, except that the three side-wall supports are replace by bail-type supports that, when in use, are maintained in substantially vertical positions by rods extending from the center of the grill. U.S. Pat. No. 3,636,938 to Faltersack shows a plurality of parallel bars that can be assembled to form a grill by placing their ends into holes in two parallel frame members. U.S. Pat. No. 3,821,926 to Clark shows a grill similar to that of Faltersack, except that the grill is assembled by passing the parallel frame members through end loops in a plurality of parallel bars. U.S. Pat. No. 3,837,328 to Schaffer shows a grill wherein the parallel bars are hinged to one another at their ends, so that frame members are eliminated. The resulting grill is supported on hinged legs when in use. Somewhat related devices are shown in U.S. Pat. Nos. 1,271,326 to Kivlan and 311,662 to Knight, showing an adjustable rack and an adjustable spit, respectively.

For use in backpacking, all of these portable grills have certain disadvantages: (1) They all require special packaging in order to maintain the grill in a neatly stowable form. Otherwise, hinged parts would become unmanageable and disassembled parts could either be lost or misplaced. (2) They all require assembly, involving unfloding bracing, locking, etc. of parts before a usable grill is provided.

SUMMARY OF THE INVENTION

The primary objects of the present invention are to overcome these deficienceis of the prior art and to provide a light-weight grill for outdoor cooking. There is an increasing need for such a grill because of the growing popularity of camping and backpacking. Hence, it is an object of the invention to provide a portable grill that is convenient to use; and that does not require the additional weight, bulk, and inconvenience of a special package or case for enclosing the grill when it is not being used. Another object of the invention is to provide a portable grill that is immediately useable and does not require assembly of loose parts nor bracing and locking of hinged parts.

The invention is constructed of an annular frame having a plurality of parallel bars attached at their ends to the frame. Two bail-type extension members are attached at their ends, via essentially tubular means, to a selected pair of the parallel bars. The extension members may be moved away from the center of the grill to any extent within their limits, to fit indigenous supports, such as stones. The extension members are moved toward the center of the grill for their stowed postions.

Because of the fact that the extension members are attached to the parallel bars rather than to the frame member, the frame can be used as a stop means both for limiting outward movement of the extension members and to prevent collapse of the extension members when they are extended, supported, and a load is placed on the grill. Also, means is provided to prevent the extension members from swinging out of the plane of the grill, so that, in its stowed position, the grill easily becomes a compact unit that requires no further packaging. This effect is produced by the sleeve attachments of the extension members to the parallel bars, enhanced by the spring biasing of the extension members toward the parallel bars. This, together with the fact that the parallel bars are normally attached to the upper surface of the frame member and that the extension members are attached to the underside of the parallel bars, provides a very compact grill of minimal thickness when in its stowed position. An alternative means of maintaining the extension members in the plane of the grill is to pass them through loops attached to the underside of the frame member.

The spring bias of the extension members toward the parallel bars also insures their frictional contact with the undersurface of the frame. This frictional contact prevents looseness, facilitating accurate adjustment of these members when they are extended.

Other objects and advantages of the invention will become apparent as the following, detailed description is read with reference to the accompanying drawings. The same parts are designated by the same numbers throughout the disclosure.

BRIEF DESCRIPTION OF THE DRAWINGS

In the drawings:

FIG. 1 is a perspective view of the grill as it is typically used in conjunction with indigenous supports;

FIG. 2 is a view of the underside of the invention with the extension members in their stowed positions;

FIG. 3 is a plan view of a second embodiment of the invention in its extended position;

FIG. 4 is a similiar to FIG. 3 but shows the invention in its stowed position;

FIG. 5 is an enlarged, detail view, partially in section, showing how the frame is supported on the extension members;

FIG. 6 is similar to FIG. 5, but shows an alternate means for fastening the extension members to the parallel bars; and FIG. 7 is a fragmentary elevation taken on line 7—7 of FIG. 6.

DESCRIPTION OF THE PREFERRED EMBODIMENTS

In a preferred embodiment, shown in FIGS. 1 and 2, the grill 7 has an annular frame 8 made of a heavy gauge, steel wire, the ends of which are welded together. In this embodiment, the annular frame 8 is circular. A plurality of parallel bars 9, preferably equally spaced apart, are welded to the upper surface of the frame 8.

For the purposes of this application, the terms "upper," "lower," "above," "below," etc. refer to the invention in its normal cooking position, wherein the grill is horizontally disposed and the extension members extend from the underside thereof.

Two diametrically opposite, U-shaped, extension members 10 are each attached to a pair of the parallel bars 9. The attachment means is essentially a sleeve or loop 11 that surrounds a bar 9 and is fixed to the end portions of each of the extension members 10. In the embodiment shown in FIG. 6, the sleeve 11 is formed by bending each end portion of the extension members 10 into a short, cylindrical coil 12. In FIG. 6, the sleeve 11 is a short tube 13 that is welded to the end portion of each of the extension members 10.

FIG. 1 shows the extension members 10 in their extended positions, as they would be in actual use. Hence, to use the invention, it is only necessary to extend the members 10 until they fit the appropriate set of indigenous supports, such as the stones 14 shown in FIG. 1. This is facilitated by the fact that the extension members 10 are infinitely adjustable within their range of extension. A source of heat, such as an open fire or a small (not shown) is placed beneath the grill for cooking.

FIG. 5 illustrates how the frame 8 acts as a stop means, both for preventing the extension members 10 from swinging upwardly, out of the plane of the grill 7 when a load is placed thereon, and to limit the movement of the extension members 10 away from the center of the grill 7.

The extension members 10 fit inside the frame 8 when in a stowed position to produce a unit of minimum thickness. This accomplished by the cooperative effects of the facts that the parallel bars 9 are welded to the upper surface of the frame 8, so that the extension members 10 fit beneath the bars when in stowed positions; and the extension members 10 are spring biased toward the parallel bars 9, so that the extension members 10 are maintained snugly inside the frame 8 and against the parallel bars 9. This spring effect of the extension members 10 is preferably an inherent property of the material from which they are made. In addition to promoting compactness, it also insures frictional contact of the extension members 10 with the lower surface of the frame 8 when in their extended positions. This facilitates precise adjustment of the extension members 10, as well as the stability of the grill 7 when under a load.

Another embodiment of the invention is illustrated in FIGS. 3 and 4. In this embodiment, the frame 16 is rectangular, and the extension members 17 are attached to different pairs of the parallel bars 9. This makes it possible for the sleeves 11 of opposite extension members 17 so slide past each other when the grill 7' is in its stowed position and for the parallel members 18 of each extension member 17 to be nearly coextensive in length with the parallel bars 9. This nearly doubles the range of adjustment of the extension members 17. The two parallel bars 9 on each side of the frame 16 are positioned close together to minimize the difference in width of the extension members. Otherwise, this embodiment of the invention is constructed, functions, and is used in a manner identical to that of the embodiment shown in FIGS. 1 and 2.

An alternative means for maintaining the extension members 10 or 17 in the plane of the grill is shown in FIGS. 6 and 7. It comprises passing the parallel legs of the extension members through loops 19 on the frame 8 or 16. These loops may either be welded to the underside of the frame, or they may be formed by bending the frame. In this embodiment, the sleeves 11 on the ends of the extension members 10 or 17 may also be simple loops.

FIG. 6 shows that the loops or sleeves 11 may be short tubes 11' welded to the end portions of the extension members 10 or 17.

An invention has been described that provides an advance in the art of outdoor cooking utensils, and is especially useful in camping and backpacking. Although the embodiments of the invention have been described specifically with regard to detail, it should be noted that many details may be altered without departing from the scope of the invention as it is defined in the following claims.

The invention claimed is:

1. An expandable, portable grill, comprising:
   a rigid, annular frame;
   a plurality of parallel bars extending across the frame, each fastened at one end to one side of the frame, and at its other end to the opposite side of the frame; and
   a pair of opposing extension members, each being substantially U-shaped, having two parallel legs, and slidably attached at each of its ends to one of a pair of said parallel bars so that it is capable of being moved inwardly and outwardly along said bars relative to the center of the grill, and whereby said frame functions as a stop means for limiting the movement of the extension members outwardly from the center of the grill, said extension members being formed for remaining substantially in the plane of the grill, when a load is impressed on its upper side and the extension members are resting on other structures, as in cooking.

2. The grill of claim 1, further including means for maintaining the extension members substantially in the plane of the grill when they are in their stowed positions.

3. The grill of claim 2 wherein the extension members are attached to the parallel bars by short sleeves that surround the bars and wherein the extension members are spring biased toward the parallel bars, to provide said means for maintaining the extension members in the plane of the grill.

4. The grill of claim 2 wherein said means for maintaining said extension members in the plane of the grill comprises loops on the frame, through which the legs of the extension members pass.

5. The grill of claim 1 wherein each of the extension members is attaced to a different pair of the parallel bars, so that the parallel legs of the extension members can be nearly coextensive in length to the parallel bars.

6. The grill of claim 5 wherein the parallel bars on each side of said grill, to which one end of each of each of the extension members is attached, are spaced close together to minimize the difference in widths of the extension members.

7. The grill of claim 1 wherein the frame is circular.

8. The grill of claim 1 wherein the frame is rectangular.

9. The grill of claim 1 wherein the attachment of each end portion of each of the extension members to the parallel bars is a short sleeve fixed to each end of each extension member and surrounding one of said parallel bars.

10. The grill of claim 9 wherein the sleeve is a short tube.

11. The grill of claim 9 wherein the extension members are formed of heavy wire and the sleeve on each end thereof is a cylindrical coil of wire.

* * * * *